Dec. 3, 1963   G. STAVIS   3,113,308
APPARATUS FOR MEASURING DOPPLER FREQUENCY DIFFERENCES
Filed June 18, 1956   3 Sheets-Sheet 1

INVENTOR.
GUS STAVIS
BY
*H. L. Markey*
ATTORNEY

INVENTOR.
GUS STAVIS
BY
ATTORNEY

INVENTOR.
GUS STAVIS
BY
*H. S. Mackey*
ATTORNEY

United States Patent Office 3,113,308
Patented Dec. 3, 1963

3,113,308
APPARATUS FOR MEASURING DOPPLER FREQUENCY DIFFERENCES
Gus Stavis, Ossining, N.Y., assignor to General Precision Inc., a corporation of Delaware
Filed June 18, 1956, Ser. No. 592,054
8 Claims. (Cl. 343—8)

This invention relates generally to apparatus for measuring Doppler frequency differences in a radio beam, and more particularly to aircraft apparatus in which beam reflection errors are minimized by the use of a lobe-switching antenna. This invention minimizes two specific kinds of beam reflection errors. The first kind of error occurs when the beam is reflected from a water surface, and is due to the dependence of target reflection intensity on the angle of incidence when a beam having finite width is employed. This error is termed the water reflection error. The second kind of beam error occurs when an aircraft pulsed Doppler radio system changes altitude. This error is termed the altitude hole error.

The applicant's invention substantially eliminates these errors by operating as if the ground or water illuminated has a very small extension in the direction of motion. The invention provides a microwave antenna which radiates a dual beam toward the earth at an oblique angle. By dual beam is meant two beams transmitted at nearly but not quite identical oblique angles, so that the beams are partly intermingled and parts of their cross sections are common.

The return or echo signals from the beams contain Doppler frequency difference information. Each such signal contains a broad spectrum of Doppler frequencies. These Doppler spectrums are isolated and applied to a device for finding the center frequency of each spectrum, and for finding the average of these two center frequencies. This device, termed a frequency tracker, contains a single-frequency resonant discriminator and an unmodulated single-frequency oscillator. This frequency tracker automatically hunts and finds the center frequency of that portion of the input Doppler spectrums which is common to both of them, and emits a signal representative of this center frequency. The Doppler information contained in this emitted signal is substantially free of the mentioned beam errors.

Further instrumentation derives from this signal a signal analogous to whatever operational quantity the apparatus measures. In airborne apparatus such operational quantities includes ground speed, drift angle, and vertical velocity.

One purpose of this invention is to provide apparatus for measuring Doppler radio frequency differences in such a way that the measurement is not subject to the described errors.

Another purpose of this invention is to provide a frequency tracker and dual input signal generator suitable for use in the mentioned apparatus.

More specifically, a purpose of this invention is to provide Doppler radio apparatus not subject to water reflection error or altitude hole error.

Still more specifically, a purpose of this invention is to provide Doppler radio apparatus employing a discriminator frequency tracker in which the output signal is derived from an illuminated target area at substantially a single oblique angle.

A further understanding of this invention may be secured from the detailed description and associated drawings, in which.

Figure 1:
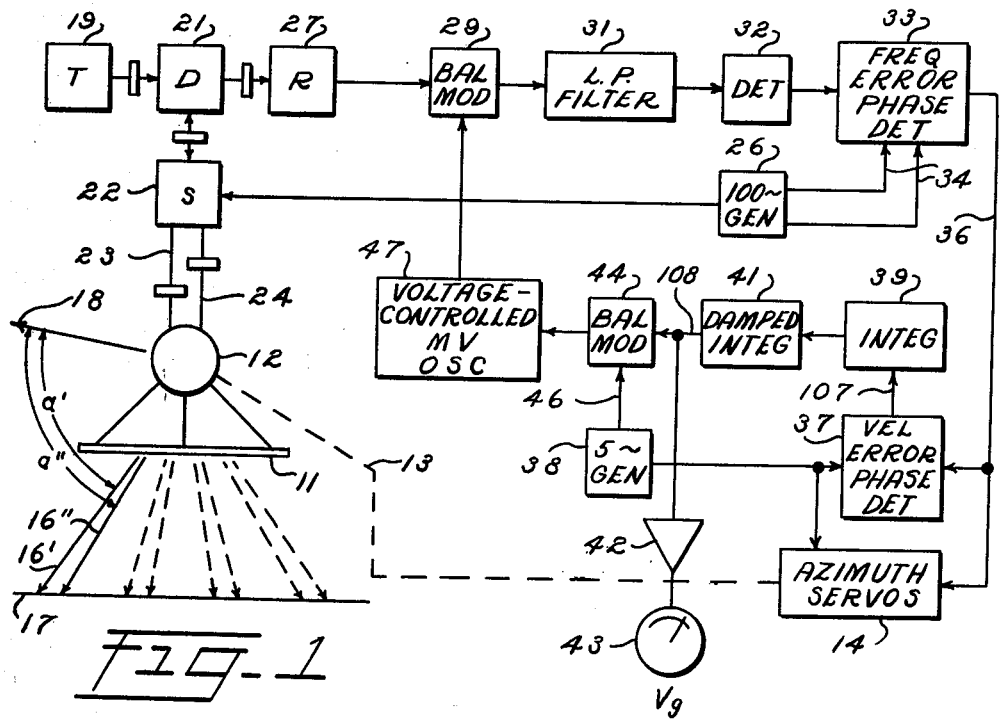
FIGURE 1 is a block drawing of apparatus embodying the invention.

Referring now to FIGURE 1, an aircraft antenna 11 is supported and stabilized to the direction of aircraft velocity by a mechanism 12. The antenna is also positioned in azimuth through shaft 13 by mechanism 14 so that it is oriented at all times to the aircraft ground track direction. The antenna 11 is composed of four similar sets of linear arrays of radiators which radiate four dual beams in four directions. Two dual beams are directed forward to the right and left and the other two are directed rearward to right and left. Each dual beam is composed of a pair of beams, such as beams 16′ and 16″, which are pointed so nearly in the same direction that their cross sections overlap. Description of apparatus and functioning will be almost entirely confined to that associated with beams 16′ and 16″, as the other beams operate similarly, and are for purposes beyond the scope of this invention. The dual beam 16′—16″ is generated by two sets of linear arrays comprising rectangular waveguides. Slight differences in waveguide width in the two sets cause slight "looking" angle differences, the looking angle being defined as the angle between the beam and the direction of motion of the aircraft. The angles $a'$ and $a''$ are intended to represent the looking angles of beams 16′ and 16″. These angles, as well as the beams 16′ and 16″ and the direction of motion 18 will in general not be in the plane of the paper. In this invention all dual beam cross sections must overlap as stated, and any form of antenna which produces such beams may be employed.

The two sets of antenna arrays composing each dual beam array are alternately energized from a pulsed microwave transmitter 19 through a duplexer 21, microwave switch 22, and separate microwave transmission waveguides 23 and 24. Switch 22 is operated at a rate of, for example, 100 cycles per second, by a square-wave generator 26. The switch 22 may be of the ferrite type or of the type described in Patent No. 2,690,539 issued September 28, 1954, and entitled Microwave Switch. The received microwave echo signals of beams 16′ and 16″ are conducted from the two sets of antennas in time alternation through switch 22 and duplexer 21 to a receiver 27, where they are coherently detected and amplified. In addition the Doppler frequency information is frequency-transformed in the receiver by conventional heterodyne methods to form output signals having the frequency of the Doppler information plus a reference frequency coresponding to zero velocity, for example, 140 kilocycles per second. One purpose of this transformation is to facilitate distinguishing between echo signal frequencies less than the transmitted frequency derived from the aft beams or during vertical ascent from all beams and echo signal frequencies more than the transmitted frequency. This transformation thus distinguishes between derived Doppler signals which otherwise would be ambiguous. The two broad-frequency-spectrum Doppler signals emitted by receiver 27 alternately at the rate of 100 c.p.s. have a central frequency depending upon the aircraft speed and the microwave transmitting frequency and may lie, for example, in the range of 3 to 40 kc. p.s. The receiver output after modulation at 140 kc. p.s. would therefore lie in the bands of 100 to 137 kc. p.s. and 143 to 180 kc. p.s.

These signals are applied to a balanced modulator 29 where it is heterodyned to "zero frequency." The output of the balanced modulator is in turn applied to a low pass filter 31 which has approximately flat transmission from zero to 100 c.p.s., with transmitted power attenuated by one-half at 130 c.p.s. The output of the low pass filter is impressed on and demodulated in a square-law detector 32 and the demodulated product is applied to a frequency error phase detector 33 which is switched at 100 c.p.s. through the medium of conductors 34 connected to the 100 c.p.s. generator 26. The lobe switching error output in conductor 36 is applied to the azimuth servo system 14 and also to a velocity error phase detector 37. The detector 37 is switched at 5 c.p.s. by a square-wave generator 38 to average the fore-aft ground speed signal. The output is applied to a simple integrator 39 and then to an integrator 41 having feedforward damping. The direct current output of the integrator 41 has a potential representing ground speed, and is applied through an amplifier 42 to a ground speed indicator 43. This direct current output is also applied to a balanced modulator 44, where it is modulated at 5 c.p.s. through conductor 45 connected to generator 38. The output of the balanced modulator contains a 5 c.p.s. component. This output is applied to a voltage-controlled multivibrator oscillator 47, the output of which is in turn applied to modulated balanced modulator 29.

Figure 2:
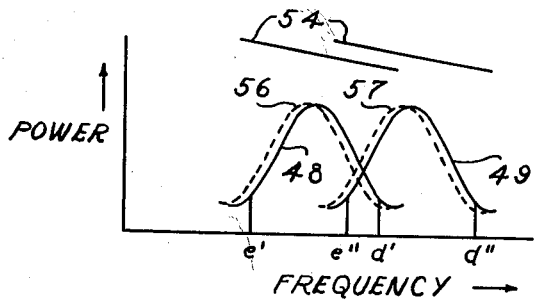
FIGURES 2, 3, 4, 5 and 8 are diagrams illustrating the operation of existing Doppler apparatus.
Figure 3:
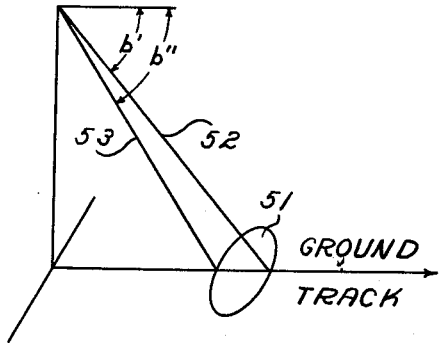

In the operation of microwave radio navigational systems as heretofore proposed a single beam has been used in place of the dual beam 16'—16". The single Doppler wideband spectrum was then applied from the receiver to a modulator where it was transformed upward in frequency by a modulating signal which was also frequency modulated at 35 c.p.s. over a narrow range, so that an intermediate frequency signal resulted having a time-shared double maximum. This is illustrated in FIGURE 2 in which the modulator output consists of the two waveforms 48 and 49, the energy alternating at 35 c.p.s. between these waveforms. The same illuminated ground pattern 51, FIGURE 3, was responsible for both power-frequency curves 48 and 49. Since Doppler frequency is proportional to the cosine of the looking angle, and since the looking angle $b'$ at the front of the ground reflector is less than the looking angle $b''$ at the rear, the points $d'$ and $d''$, FIGURE 2, represent the Doppler frequencies attributable to beam edge 52 and points $e'$ and $e''$ represent the Doppler frequencies attributable to the beam edge 53.

The waveforms 48 and 49 as drawn are symmetrical, and will in fact be symmetrical if the radiated beam cross section be symmetrical in the fore and aft direction about its axis, and if the reflection of the earth reflecting surface be independent of the angle of incidence. Both of these conditions substantially exist when the radiation is reflected from land, but when the radiation is reflected from water the magnitude of the signal return is inversely proportional to the angle of incidence. A vertical ray is returned most strongly, and a nearly grazing ray is returned little or not at all. Therefore over water both of the derived spectrums of FIGURE 2 will, in effect be added to slanting characteristics, lines 54, representing the water reflection as a function of the incidence angle which may be expressed in terms of Doppler shift frequency. The result is to displace both spectrums toward the left as indicated by the dashed line forms 56 and 57.

The same kind of beam reflection error occurs due to "non-white" noise generated as follows. A supersonic aircraft generates a shockwave in the air near it which by refraction asymmetrically broadens the received signal. Additionally, air turbulences, vibrations of the transmitting microwave generator, of the radome and of other structures introduce microwave modulations of the same frequencies as the mechanical vibrations, and are classed as noise. These modulations have considerable low-frequency amplitude and taper off at higher frequencies, so that within the Doppler spectrum frequency range their asymmetrical effects may also be depicted by the lines 54, and will displace the envelopes 48 and 49 to positions 56 and 57 exactly as asymmetrical water reflection displaces them.

Figure 4:
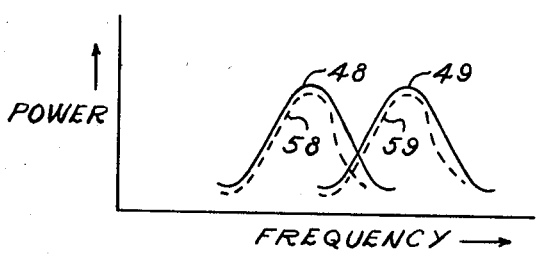

Altitude hole error changes the characteristic forms somewhat differently. When an aircraft employs pulsed microwave Doppler radio, the receiver is blocked or gated off during the transmitting pulse time. If then the altitude be such that the radiation travel and reflection time exactly equals a multiple of the pulse repetition period, much of the echo energy will arrive during the gated-off period and will not be perceived by the receiver. If the echo energy arrives at the receiver at the beginning or end of the gated-off period, part will affect the receiver but part will not, and the average of the Doppler frequencies in the part received will not equal the average of the whole Doppler spectrum. This is graphically shown in FIGURE 4, in which the waveforms 48 and 49 of FIGURE 2 are repeated. It is assumed that the parts of the spectrum which are received last, both derived from the edge 52, FIGURE 3 of the beam, are blocked and lost, leaving the lower frequency portions as indicated by the two dashed waveforms 58 and 59, FIGURE 4.

Figure 5:
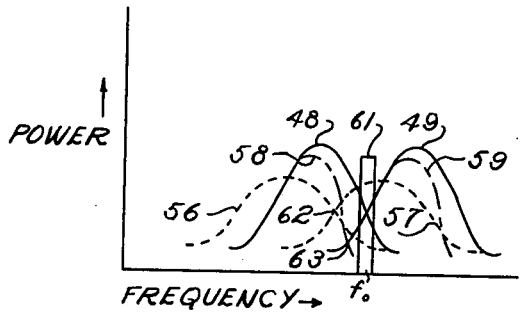

In the operation of prior systems the two spectrums are applied to a sharp band pass filter, and frequencies are adjusted until the energies from the two power-frequency forms are equal within the pass band of the filter. This is indicated in FIGURE 5, in which the two symmetrical waveforms 48 and 49 have been centered about the pass band frequency 61 of the filter. When the waveforms are symmetrical and the filter band is thus centered it is fixed at the crossing of the curves and equidistant from the centers thereof. However, if the curves be displaced to the right or left, as dashed curves 56 and 57, the crossing will be displaced to point 62, and centering the filter band thereon would move it from the depicted correct position. Thus overwater operation and "non-white" noise will cause the frequency tracker output to be in error.

When altitude hole error exists the waveforms will be distorted to the dot-dash lines 58 and 59, again shifting the intersection, in this case to the point 63. Thus operation at certain altitudes results in frequency tracker output error. Actually some altitude hole error occurs at elevated altitudes at substantially all heights because of the large time-width of high altitude Doppler spectra, so that this error is important.

Figure 6:
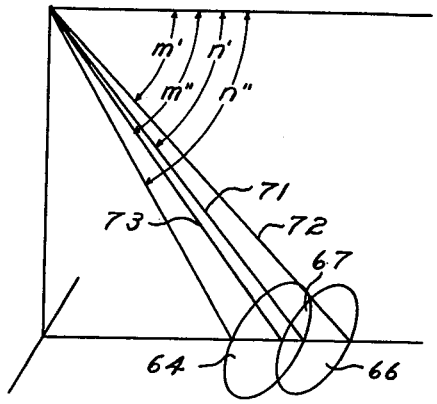
FIGURES 6, 7, 9, 10 and 11 are diagrams illustrating the operation of apparatus embodying the invention.
Figure 7:
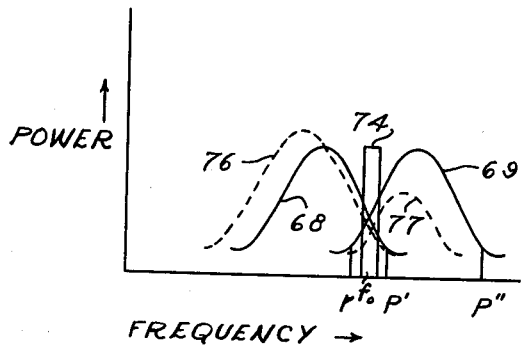

The simple manner in which the present invention eliminates most of the sea reflection error, non-white noise error, and altitude hole error is indicated in FIGS. 6 and 7. Two beams constituting the dual beam have limit looking angles of $m'm''$ and $n'n''$, and have reflection areas 64 and 66 in the ground plane. These areas intersect and the area 67 is common to both. The areas 64 and 66 reflect echoes from which are derived two Doppler spectrums, and these if heterodyned to a higher frequency would give power-frequency characteristic curves like curves 48 and 49, FIG. 2, and are depicted as curves 68 and 69, FIG. 7. There is, however, an important difference. The similar points $p'$ and $p''$ do not come from the same ground point, but come from near the lower ends of beam rays 71 and 72, FIG. 6. Also point $r$, FIG. 7, comes from the foot of ray 73, FIG. 6, near the foot of ray 71. Therefore a filter transmission band 74 centered at the intersection receives, as input, portions of the two Doppler spectrum signals from the same part of the reflecting area, namely area 67, FIG. 6.

Variation of the characteristic forms because of sea reflection will not substantially change the frequency of the intersection of the curves, which will be moved sideways and changed in size as indicated by the dashed lines 76 and 77, FIG. 7. The small amount by which the intersection is shifted sideways on the frequency scale is expressed exactly by $$\frac{m}{2q}$$

in which $m$ is the slope of a linear relation between the coefficient in db of the water reflection of radio signals and the cosine of the looking angle. The term $q$ is the coefficient of filter sharpness, being larger for a narrow filter and infinite for a zero width filter. This relation thus discloses that, when an infinitely sharp filter is used, the method is exact and the output signal cannot have any error whatever due to sea reflection or non-white noise.

When the error is caused by an altitude hole the solution is not simple and the above simple relation is not adequate. However, qualitatively a similar result is secured and the error due to altitude holes is greatly reduced if not eliminated when a narrow filter is used.

Figure 8:
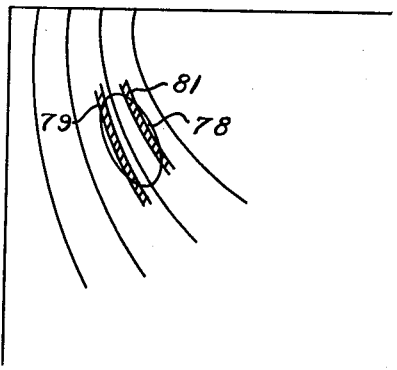
Figure 9:
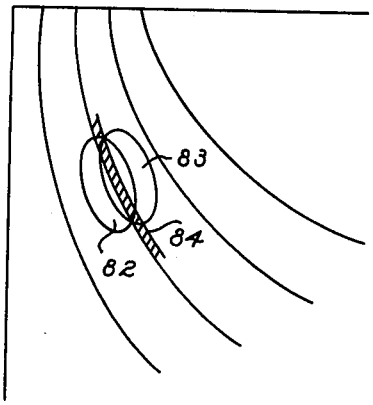

Plan views of the illuminated areas facilitate visualization of the invention and contrast it with prior practice. FIGS. 8 and 9 are ground plans in which the curved lines are lines of equal looking angles. In FIG. 8, representing prior practice, the illuminated area 78 is sampled by the frequency tracker along paths 79 and 81 and the power average is taken to find the center line of the area. Obviously any distortion of the area figure will cause a shift in the center line found. In FIG. 9, however, illustrating this invention, two signals from the two areas 82 and 83 are derived only from the portions along path 84, both signals representing the same looking angle. Therefore errors which are dependent upon change of looking angle across the width of the entire illuminated area are minimized because the strip 84 encompasses only a very small looking angle range.

In the operation of the instant invention the information contained in the dual beam must be interpreted. In this detailed description a specialized frequency tracker is employed as the interpreting device. In the description of functioning of this specialized frequency tracker it is helpful to remember that several variations, modulations and demodulations are simultaneously performed in the main feedback loop. These may be distinguished in most cases by the frequencies involved and are classified as follows:

(1) Modulation of 100–180 kc. p.s. Doppler information to "zero frequency" in modulator 29, FIG. 1.

(2) Time variation of the dual beam between its two component beams at 100 c.p.s. and detection in phase detector 33.

(3) Time variation of four dual beams fore and aft at 5 c.p.s. with frequency tracker synchronous modulation in balanced modulator 44 and detection in phase detector 37.

(4) Time variation of four dual beams right and left at 5 c.p.s. with detection in the azimuth servomechanism circuit.

The second classification involving the 100-cycle frequency is the only one of vital interest in this description, the others being included to complete the description of a useful device.

The detailed description of frequency tracker operation starts with the balanced modulator 29, to which the dual Doppler frequency spectrum represented by curves 68 and 69, FIG. 7, is applied from receiver 27. Each signal contains a broad frequency spectrum in the range between 100 and 180 kc. p.s., the spectrum width being about 15% of its center frequency, and the pair of spectrums overlapping in frequency. This spectrums are alternated in time at 100 c.p.s. The modulator 29 also receives a single-frequency signal, not modulated at 100 c.p.s., in the same 100–180 kc. p.s. range and at null centered in frequency at the intersection of the two Doppler spectrums. This single-frequency signal is received from oscillator 47. So far as this invention is concerned this oscillator output is single-frequency, but for the purpose of azimuth alignment and speed measurement the oscillator 47 is frequency modulated over a small range at 5 c.p.s. However, this 5 c.p.s. modulation does not affect lobe-switching operation and so is ignored here.

Figure 10:
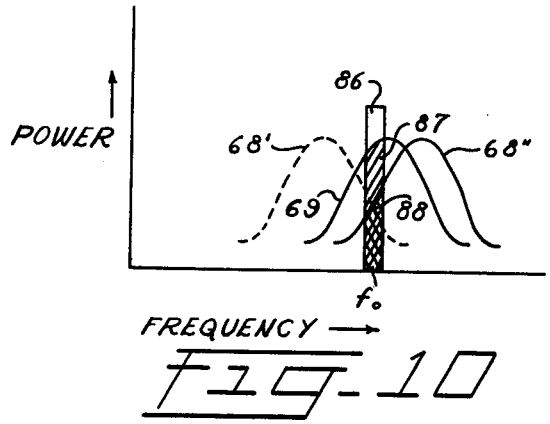
Figure 11:
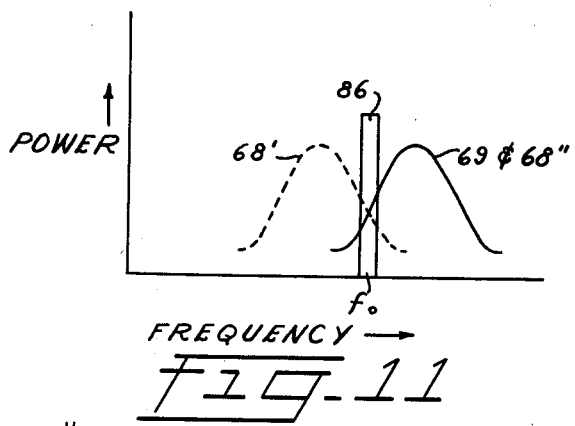

The low-pass filter 31 operation is in accordance with the description of FIG. 7 except that the center filter frequency, $f_0$, is at zero cycles per second. The flat band pass is thus 200 c.p.s., and is indicated in FIGS. 10 and 11 by the band 86 centered at $f_c=0$. In FIG. 10 the filter band is not centered at the intersection of signal spectrum 69 and hypothetical spectrum 68' corresponding to spectrum 68, FIG. 7. The spectrums having been modulated to "zero frequency" the spectrum 68' now physically has become the spectrum 68'', FIG. 10. The two spectrums are passed by the filter in different amounts. The spectrum 69 is transmitted through the filter in accordance with the single-hatched power-frequency area 87 extending to the base line, while the spectrum 68'' is transmitted in less amount defined by the double-hatched area 88. The difference, area 87 minus area 88, gives rise to an error signal which transforms the Doppler signal frequencies to such extent, moving them relatively to the filter band 86, that they are centered as indicated in FIG. 11. The hypothetical spectrum 68' (having frequencies below zero frequency) physically exists as above-zero frequencies and as spectrum 68'' falls on the spectrum 69, with which it is now identical.

Square-law detector 32 rectifies the modulator output and produces a 100 c.p.s. signal containing error magnitude and phase information. The magnitude, being in proportion to the square of the voltage applied to the detector, is in proportion to the power, thus being adapted to determining the power-frequency characteristics spectrum intersection as just described.

Figure 12:
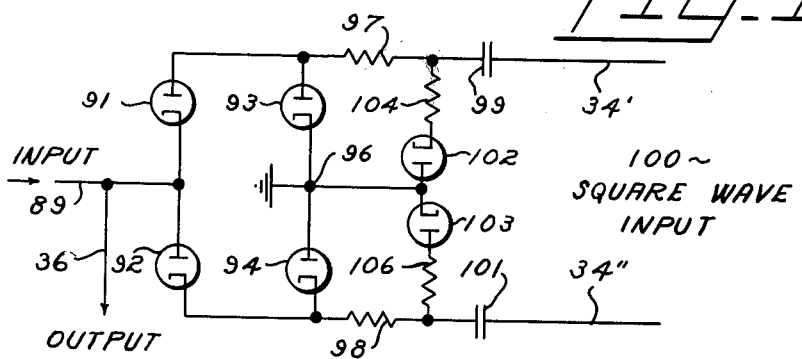
FIGURE 12 is the schematic wiring diagram of a phase detector which may be used in the invention.

The detector output is applied to phase detector 33 which may, for example, have the circuit of FIG. 12. In this circuit the input conductor 89 is connected to two diodes 91 and 92 and through them to diodes 93 and 94 grounded at their junction 96, all four diodes being poled alike. The diodes 93 and 94 are also connected through isolating resistors 97 and 98 and capacitors 99 and 101 to the two conductors 34' and 34'' from 100 c.p.s. generator 26, FIG. 1. Another pair of diodes 102 and 103 is bridged in series with resistors 104 and 106 across the 100 c.p.s. input.

In operation of this phase detector, when conductor 34' is positive all four diodes 91, 92, 93 and 94 conduct and signal input conductor 89 is grounded through junction 96. When conductor 34' is negative these four diodes are non-conductive. Therefore if the phase of the input signal on conductor 89 be that of conductor 34', all positive half cycles will be reduced to ground potentials but all negative half cycles will attain peak-to-peak potential and a corresponding negative intermittent direct-current potential will be produced on output conductor 36. On the other hand, if the phase of the input signal be the same as that of conductor 34'' all negative half cycles will be grounded and a positive intermittent direct-current potential of peak-to-peak magnitude will be produced on output conductor 36. Diodes 102 and 103 conduct when conductor 34'' is positive, grounding capacitors 99 and 101 and normalizing them once each cycle by draining their charges.

The 5 c.p.s. switching of the four dual antenna beams to right and left of the ground track is utilized in the azimuth servomechanism 14, FIG. 1, which receives the described direct-current error output 36 of phase detector 33 containing 5 c.p.s. amplitude modulation. The antenna 11 is thus servoed to point in the direction of the velocity vector.

When ground speed indication is an output of this system, as is assumed for the purpose of illustration, the 5 c.p.s. amplitude modulation in the direct-current error signal in conductor 36 is removed by the velocity error phase detector 37. This phase detector also has the circuit of FIG. 12 except that its switching input at conductors 34' and 34'' has the frequency of 5 c.p.s. Its output at conductor 107, FIG. 1 is therefore unmodulated direct-current representing the error of adjustment of the two Doppler spectrums relative to low pass filter 31.

This error signal is applied to the simple integrator 39 and to the damped integrator 41. The function of the damping is to stabilize the entire frequency tracker feedback loop. The output of damped integrator 41 is direct-current, and is effectively applied to the voltage-controlled multivibrator oscillator 47. The output frequency of this oscillator is linearly controlled by the integrator 41 output voltage. This output voltage is therefore an exact measure of the frequency of the oscillator output, and since the latter is, at balance, equal to the average center frequency of the dual Doppler input signal spectrum, this voltage is an exact analog thereof. Additionally the dual Doppler input signal spectrum average frequency bears an exact numerical relation to the Doppler frequency representing aircraft speed, therefore the voltage at conductor 103 can be employed to indicate speed. This is done by connecting conductor 103 through the amplifier 42 to the voltmeter indicator 43 calibrated directly in units of aircraft speed.

The balanced modulator 44 multiplies the direct potential input from conductor 103 by 5 c.p.s. alternating potential through conductor 46 from generator 38, so that the generator 47 output frequency is "wobbled," or frequency modulated, through a small range, for the purposes of aircraft speed measurement as described.

In describing the two component beams 16' and 16," FIGURE 1, of the dual microwave beam, the 100 c.ps. movement of the energy from one beam to the other was described as a switching operation involving a microwave switch 22 actuated by a 100 c.p.s. square wave from generator 26. However, the invention is operative when a single beam is swept in a sinusoidal or other non-abrupt manner from one dual beam component direction to the other. In this case a variable power divider is substituted for switch 22 and the generator 26 has, for example, a sinusoidal output waveform.

What is claimed is:

1. A self-contained aircraft Doppler system for measuring an operational quantity comprising, antenna means emitting two microwave beams in nearly the same direction in space, said beams having parts of their cross-sectional areas in common, a transmitter energizing said antenna means, a receiver actuated from said antenna means and emitting two signals containing Doppler data from the common portions of said two beams respectively, and means energized by said two signals for finding a single frequency representative of the frequencies of said two signals and for emitting an output signal representative of the single frequency, said output signal being an analog of said operational quantity to be measured and embodying a relatively constant relation between Doppler frequency difference and said quantity.

2. A self-contained aircraft Doppler system for measuring an operational quantity comprising, antenna means emitting two microwave beams in two different directions, the cross sections of said two beams intersecting each other in a common beam cross-sectional area, a transmitter energizing said antenna means, a receiver actuated from said antenna means and emitting two signals containing Doppler data from the common portions of said two beams respectively, and frequency tracker means energized by said two signals for finding a single frequency output signal representation of an average of frequencies of said two signals, said frequency tracker containing an oscillator emitting an unmodulated output signal and containing a single filter having a single resonant frequency, said output signal being an analog of said operational quantity to be measured and embodying a relatively constant relation between Doppler frequency difference and said quantity.

3. A self-contained aircraft Doppler system for measuring an operational quantity comprising, antenna means emitting two microwave beams in two different directions, the cross-sectional areas of said two beams having a common and joint area, a transmitter energizing said antenna means, a receiver actuated from said antenna means emitting two signals containing Doppler data from said common and joint areas, each one of said two signals representing a respective one of said two beams, and a frequency tracker energized by said two signals for finding and emitting a single frequency output signal representative of an average of the average frequencies of said two signals, said frequency tracker including modulator means receiving said two signals and emitting two broad overlapping modulation product signals, oscillator means applying to said modulator means a heterodyning signal having an adjustable single-valued non-modulated frequency, filter means having a single resonant fundamental frequency and receiving said two modulation product signals, and detecting and integrating means actuated by said filter means for adjusting the frequency of said oscillator means, whereby the average frequencies of the modulation product spectrums are caused to bracket the resonant frequency of said filter means.

4. A Doppler system in accordance with claim 3 in which a timer causes said antenna means to emit said two microwave beams alternately whereby said two modulation product signals are alternately applied to said filter means.

5. A self-contained aircraft Doppler system for measuring an operational quantity comprising, a stabilized microwave antenna emitting two beams in nearly the same direction in space, said beams having partly common cross-sectional areas, a timer connected to said antenna alternating the emission of said two beams, a transmitter energizing said antenna, a receiver connected to said antenna emitting two signals containing Doppler information representing echo energy in the common area of said two beams respectively, and a frequency tracker including a modulator receiving said two signals and emitting two broad overlapping frequency spectrum modulation product signals, a filter energized by said modulation product signals and having a single resonant fundamental frequency, phase detection means connected to said timer and to said filter, said phase detection means emitting two alternate error signals representing the departures of the averages of said two modulation product signal frequencies from the resonant frequency of said filter, an adjustable single-frequency oscillator modulating said modulator, and an integrator actuated by said error signals controlling the frequency of said oscillator in accordance with the integral of said alternate error signals.

6. A Doppler microwave system for measuring an operational quantity having a constant ratio between a Doppler difference frequency and said operational quantity comprising, antenna means emitting two microwave beams having partly common cross-sectional areas, a transmitter-receiver connected to said antenna means, said transmitter-receiver emitting two signals containing Doppler information from the common portions of said two microwave beams respectively, and means energized by said two signals and emitting an output signal representative of the average of the frequencies of the two signals and constituting an analog of said operational quantity with relative immunity of calibration ratio to changes in range and type of target.

7. A frequency tracker emitting a single frequency signal representative of the frequencies of two input signal frequency spectrums having portions in common comprising, a modulator, timer means alternately applying said input signals to said modulator, an adjustable local oscillator having its output impressed on said modulator whereby the output of said modulator comprises two alternate overlapping signal spectra, a filter having a single resonant fundamental frequency connected to the output of said modulator, and detecting and integrating means actuated by the output of said filter adjusting the signal frequency of said oscillator until the overlapping signal spectra applied to said filter is symmetrically disposed relative to the resonant frequency of said filter.

8. A frequency tracker emitting a single frequency signal representative of a common frequency of two input signal frequency spectrums having portions in common comprising, a modulator, timer means alternately applying said input signals to said modulator, an adjustable single-frequency oscillator the output signal of which is impressed on said modulator whereby the output of said modulator comprises two overlapping modulation product signal spectra, a filter having a single resonant fundamental frequency energized by the output of said modulator, a phase detector connected to said timer and said filter, producing therefrom alternate error signals representing the departure of the averages of said two modulation product signal spectra from the resonant frequency of said filter, and an integrator actuated by said error signals controlling the frequency of oscillator in accordance with the integral of said alternate error signals.

References Cited in the file of this patent
UNITED STATES PATENTS
3,045,232   Mercer _____ July 17, 1962